(12) United States Patent
Attride et al.

(10) Patent No.: US 7,738,860 B2
(45) Date of Patent: Jun. 15, 2010

(54) CONTROLLING ACCESS TO WIRELESS COMMUNICATIONS DEVICE FEATURES BASED ON USER PROFICIENCY

(75) Inventors: Roy R. Attride, Raleigh, NC (US); Timothy Bass, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1050 days.

(21) Appl. No.: 11/443,722

(22) Filed: May 31, 2006

(65) Prior Publication Data

US 2007/0281731 A1 Dec. 6, 2007

(51) Int. Cl.
*H04M 3/42* (2006.01)
(52) U.S. Cl. .................................. 455/414.1
(58) Field of Classification Search .......... 455/461, 455/550.1, 556, 414.1
See application file for complete search history.

(56) References Cited

U.S. PATENT DOCUMENTS 4,685,677 A * 8/1987 Demar et al. ............. 463/23

2003/0090515 A1 5/2003 Chang et al.
2007/0157092 A1* 7/2007 Wadhwa ................ 715/707

FOREIGN PATENT DOCUMENTS

| EP | 0794647 | 9/1997 |
| EP | 0982911 | 3/2000 |
| GB | 2381431 | 4/2003 |
| WO | WO2005117544 | 12/2005 |

OTHER PUBLICATIONS

International Search Report With Written Opinion, International Application No. PCT/US2007/060475, Mailing Date: Nov. 2, 2007.

* cited by examiner

*Primary Examiner*—George Eng
*Assistant Examiner*—Christopher M Brandt
(74) *Attorney, Agent, or Firm*—Coats & Bennett, P.L.L.C.

(57) ABSTRACT

One or more features of varying complexity are available with a wireless communications device. A controller in the device determines a user's skill level at operating one or more of the features, and selectively activates the features appropriate for the skill level. The controller also activates a tutorial associated with a selectively enabled feature to teach the user how to operate the feature. As the user gains experience with the selectively enabled feature, the controller selectively enables more complex features and activates their associated tutorials.

23 Claims, 9 Drawing Sheets

CONTROLLING ACCESS TO WIRELESS COMMUNICATIONS DEVICE FEATURES BASED ON USER PROFICIENCY

BACKGROUND

The present invention relates generally to wireless communications devices, and particularly to portable consumer electronics devices that adapt their functionality to a user's experience level.

Consumer electronics devices, such as cell phones and Personal Digital Assistants (PDAs), are extremely popular with a large majority of the population. These devices are typically rich in functionality that allow users to engage in two-way voice communications, send and receive text messages and email, play games, take pictures, and browse the Internet. Many consumers use these devices every day, and thus, are savvy enough to quickly and easily learn new functionality. Many others, such as older people and the very young, are not. These varying levels of user experience can be problematic.

Inexperienced users, for example, may be tentative about using some features because they lack the understanding needed to operate them. Such features may therefore remain unused even though the user paid for them with the purchase of the device. Likewise, unused or seldom used features take up precious resources. The software needed to operate unused features, for example, remains in an uncompressed state in memory. Battery power may be expended maintaining features that are unused or seldom used. Service providers are also affected in that they cannot sell services to users who lack the understanding to operate functionality in their devices. Thus, a potential income stream is lost or unrealized.

SUMMARY

The present invention is directed to a wireless communications device that selectively controls access to features and functionality available with the device based on the user's experience or skill level at operating those features. In one embodiment, the wireless communications device includes features and functionality of varying levels of complexity that require varying levels of user skill to operate. A controller in the device detects and stores usage data comprising indicators of the user's interaction with the wireless communications device. The controller determines a user's skill level or proficiency level relative to the features based on the usage data, and selectively activates the features most appropriate for the user's detected skill level. The controller may also activate a tutorial associated with a selectively enabled feature to teach the user how to operate the feature. As the user gains proficiency at operating the enabled feature, the controller selectively enables additional, more complex features and activates their associated tutorials.

DETAILED DESCRIPTION

The present invention relates to a wireless communications device that selectively controls access to its features and functionality based on the user's experience or skill level. In one embodiment, a set of features on the wireless communications device is enabled so that inexperienced users may perform basic functions. As the users gain familiarity and experience with this basic set of features, the wireless communications device selectively enables additional, more complex features for the user, and teaches them how to use these features. The wireless communications device may determine varying levels of user experience or skill by detecting and tracking how the user interacts with the device while using various features.

Figure 1:
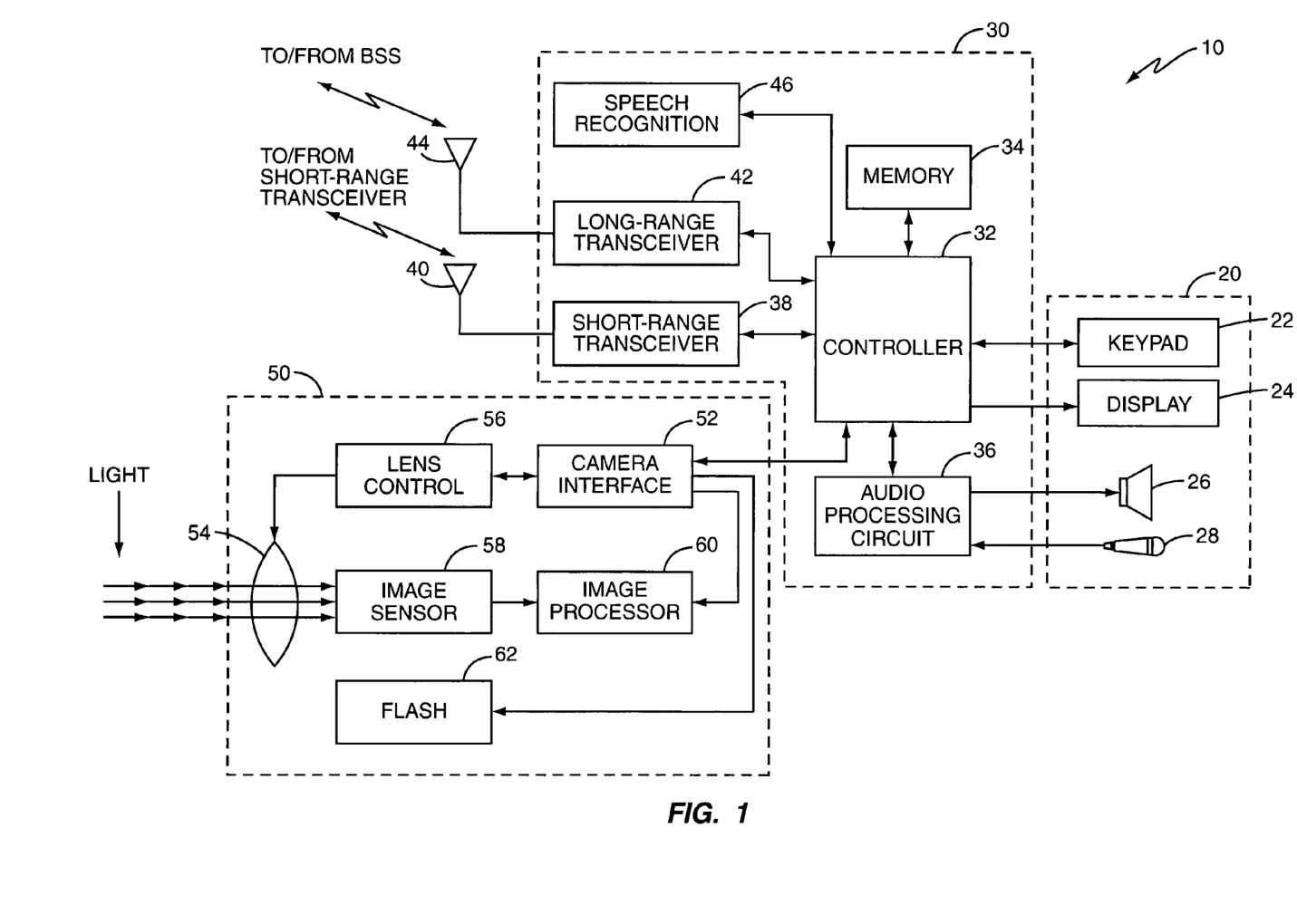
FIG. 1 is a block diagram illustrating a wireless communications device configured according to one embodiment of the present invention.

FIG. 1 illustrates an exemplary wireless communications device configured to operate according to one embodiment of the present invention. The illustrated wireless communications device integrates a cellular telephone and a camera into the same physical package, and is referred to herein as a camera phone 10. It should be noted, however, that the present invention is not limited to being a camera phone but may be embodied in other portable electronics devices that may or may not incorporate a camera. Such devices include, but are not limited to, personal digital assistants (PDA), personal communication service (PCS) devices, satellite phones, palm-top computers, and the like.

FIG. 1 is a block diagram showing some of the functional components of an exemplary camera phone 10. Camera phone 10 comprises a user interface (UI) 20, communications circuitry 30, and a camera 50. Generally, UI 20 allows a user to interact with and control the operation of camera phone 10. UI 20 includes user controls such as a keypad 22 and display 24, a speaker 26 to render audible sound to a user, and a microphone 28 to convert the user's speech into audio signals for transmission to one or more remote parties. Keypad 22 may be used to cause camera 50 to capture images, which may be displayed for the user on display 24.

Communications circuitry 30 includes the components necessary to communicate data over one or more wireless communications networks (not shown). In FIG. 1, the communications circuitry 30 includes a controller 32 connected to memory 34, an audio processing circuit 36, a long-range transceiver 38 connected to an antenna 40, a short-range transceiver 42 connected to antenna 44, and speech recognition circuitry 46. Those skilled in the art will appreciate that camera phone 10 may include other components in addition to, or in lieu of, those shown in FIG. 1, depending upon its intended use and the functionality that camera phone 10 is able to perform.

Controller 32 controls the operation of camera phone 10 according to programs and data stored in memory 34. The controller 32 may be implemented as a single microprocessor or multiple microprocessors. Suitable microprocessors may include, for example, both general purpose and special purpose microprocessors, as well as digital signal processors. As described in more detail below, controller 32 may be configured to selectively control access to features and functionality of the camera phone 10 based on a user's detected experience level with the functions and features of camera phone 10.

Long-range transceiver 38 is a fully functional cellular radio transceiver coupled to an antenna 40 for receiving and transmitting signals over a wireless communications network (not shown). Transceiver 38 may operate according to any known standard, including but not limited to, Global System for Mobile Communications (GSM), Universal Mobile Telecommunication System (UMTS), TIA/EIA-136, Code Division Multiple Access (CDMA), cdmaOne, cdma2000, and Wideband CDMA.

Short-range transceiver 42 is coupled to antenna 44 for transmitting signals to and receiving signals from a corresponding short-range transceiver (not shown) via a short-range interface. In one embodiment, short-range transceiver 42 comprises a BLUETOOTH transceiver or RF transceiver operating according to the IEEE 802.11 family of standards. However, short-range transceiver 42 may utilize any technology known in the art operable to transmit and receive signals over short distances.

Speech recognition circuitry 46 may comprise, for example, a digital signal processor (DSP) or other speech processing circuitry capable of recognizing voice commands issued by a user. When enabled, speech recognition circuitry 46 detects user-spoken terms and/or phrases at microphone 28, and compares them to pre-determined voice commands stored in memory 34. As is known in the art, controller 32 may control the features and functions of camera phone 10 based on whether the detected audible sound matches one of the pre-determined commands in memory 34.

Camera 50 interfaces with communication circuit 30 via a camera interface 52. Camera 50 includes lens 54, a lens control 56, an image sensor 58, an image processor 60, and an optional flash 62. Lens 54, which may comprise one or more lenses (fixed or auto-focus), manipulates an image by collecting and focusing light onto the image sensor 58 based on control signals received from lens control 56. Lens control 56 controls the optical properties of lens 54, such as focus, zoom, and shutter speed, based on control signals received from controller 32. Image sensor 58 captures the images formed by lens 54, and may comprise any conventional image sensor, such as a charge-coupled device (CCD), a complementary metal oxide semiconductor (CMOS) image sensor, and the like. Image processor 60 processes raw image data from image sensor 58 for subsequent storage in memory 34, output to display 24, and/or for transmission to one or more remote parties via communications circuit 30.

The camera phone 10 of the present invention is configured to selectively control access to features and functionality based on a determination of the user's experience and/or proficiency level at using the features. In one embodiment, the camera phone 10 initially enables a basic set of features suitable for less experienced users. Tutorial assistance may be provided to help less experienced users become more proficient at using these basic features. The camera phone 10 may detect one or more indicators of the user's increasing proficiency level while using these features, and save that qualifying statistical data in memory 34. As the user's proficiency level increases, the camera phone 10 may enable additional, more complex features for the user and provide tutorial assistance describing how to operate the more complex features.

Figure 2:
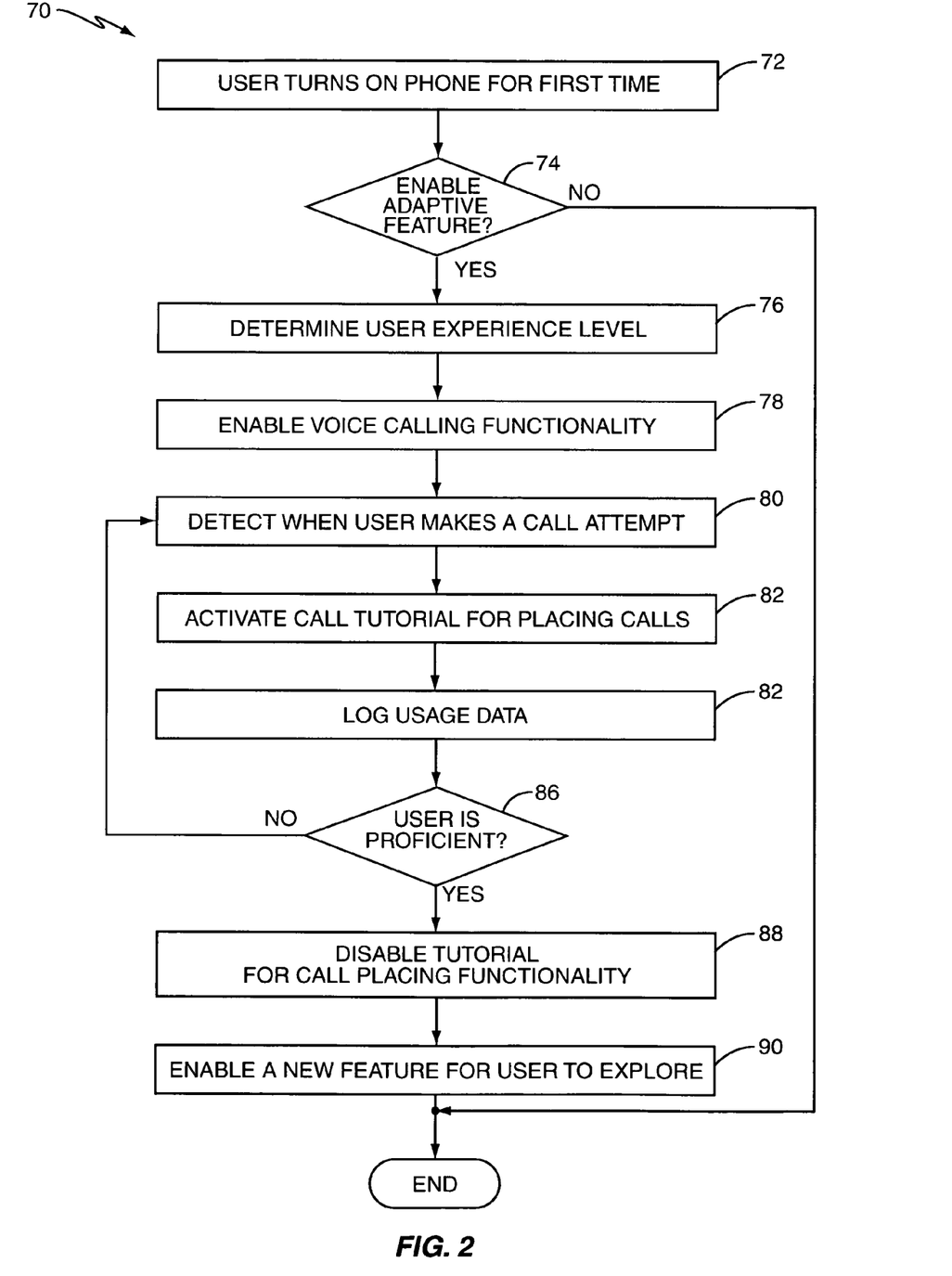
FIG. 2 is a flow chart illustrating a method of carrying out one embodiment of the present invention.

FIG. 2 is a flow chart that illustrates how one exemplary embodiment of the present invention helps an inexperienced user gain proficiency using the camera phone 10 by allowing access to basic features and controlling access to more complicated features. In this embodiment, the controller 32 enables the features that allow the user to enter a remote party's phone number using the keypad 22, while disabling the features that an inexperienced user might find too complex.

Method 70 may begin when the inexperienced user turns on the camera phone 10 for the first time (box 72). Controller 32 initially displays a dialog that asks the user whether they wish to have the adaptive functionality feature enabled (box 74). An information message describing the adaptive functionality feature may also be displayed so that more experienced users can bypass this functionality. Provided the user wishes to enable this functionality, the controller 32 may prompt the user to enter his or her experience level (box 76). In one embodiment, the controller 32 prompts the user with one or more questions regarding their knowledge and/or comfort level with the camera phone 10, and selects an appropriate experience level for that user. Controller 32 may then enable a selected basic set of features and functions appropriate for the determined level while disabling more complex features to prevent possible user confusion. In this embodiment, controller 32 enables voice communications functionality that will enable the user to place voice calls (box 78).

Controller 32 may detect an outgoing call attempt by detecting a user keypress on keypad 22 or, for clam shell-type devices, detecting when the user opens the device (box 80). If the user does wish to place an outgoing call, controller 32 may activate a tutorial to assist the user in placing a call (box 82). As described later in more detail, the tutorial may be one or more multimedia-based help screens that assist the user through the steps of using the keypad 22 to enter a phone number and place the call.

As the user places the call, the controller 32 may gather statistical data related to the user's call attempt (box 84). The statistical data may include, but is not limited to, whether the user needed the tutorial to place the call, a date and time the user viewed the tutorial and/or placed the call, how the user placed the call (e.g., direct dialing), or the number of keypress errors the user committed while placing the call. The statistical data, which controller 32 stores in memory 34, may further be time qualified to allow the controller 32 to determine user proficiency over a predetermined time period. In one embodiment, the controller 32 gauges user proficiency by determining that the user frequently places phone calls with relatively few or no keypress errors. In other embodiments, the controller 32 may determine that the user has placed a predetermined number of calls over a predetermined time period and determine that the user has become proficient at that task.

Once controller 32 determines that the user is proficient at the direct dialing method (box 86), the controller 32 may disable that particular tutorial functionality (box 88) and enable a new feature and corresponding tutorial for the user (box 90). The newly enabled feature may or may not be associated with the currently enabled features, and may or may not be more complicated to operate than the currently enabled features. For example, controller 32 may enable functionality that allows the user to place calls to phone numbers stored in a list in memory 34. One or more tutorials may also be provided to assist the user in storing the numbers, and to place a call by selecting a phone number from the list. Similarly, once the user has been deemed to be proficient in those call placement methods, the controller 32 may enable the speech recognition circuitry 46 and guide the user through the steps of issuing voice commands to select and/or dial a desired phone number.

Figure 3A:
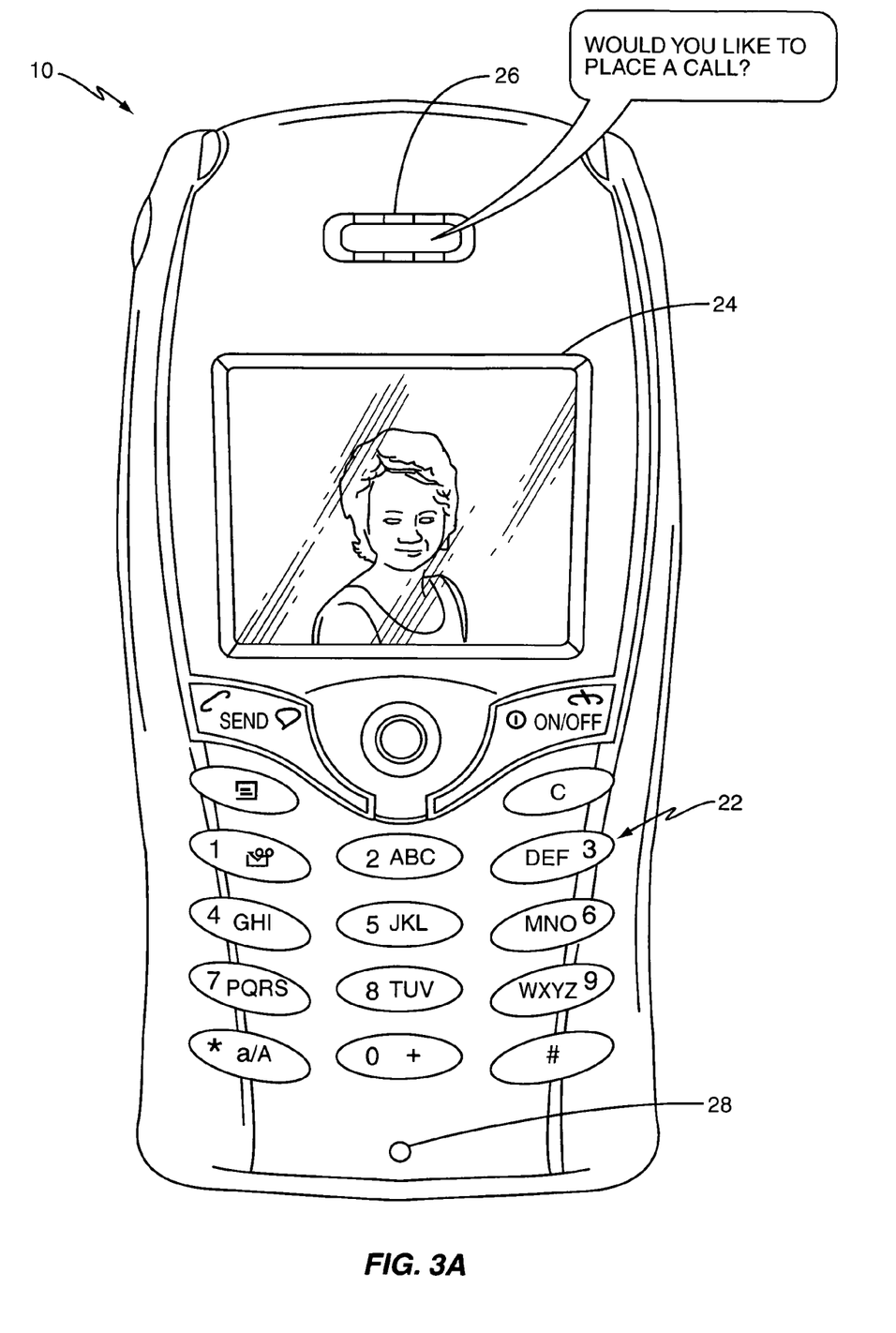
FIGS. 3A-3D are perspective views illustrating a wireless communications device operating according to one embodiment of the present invention.
Figure 3B:
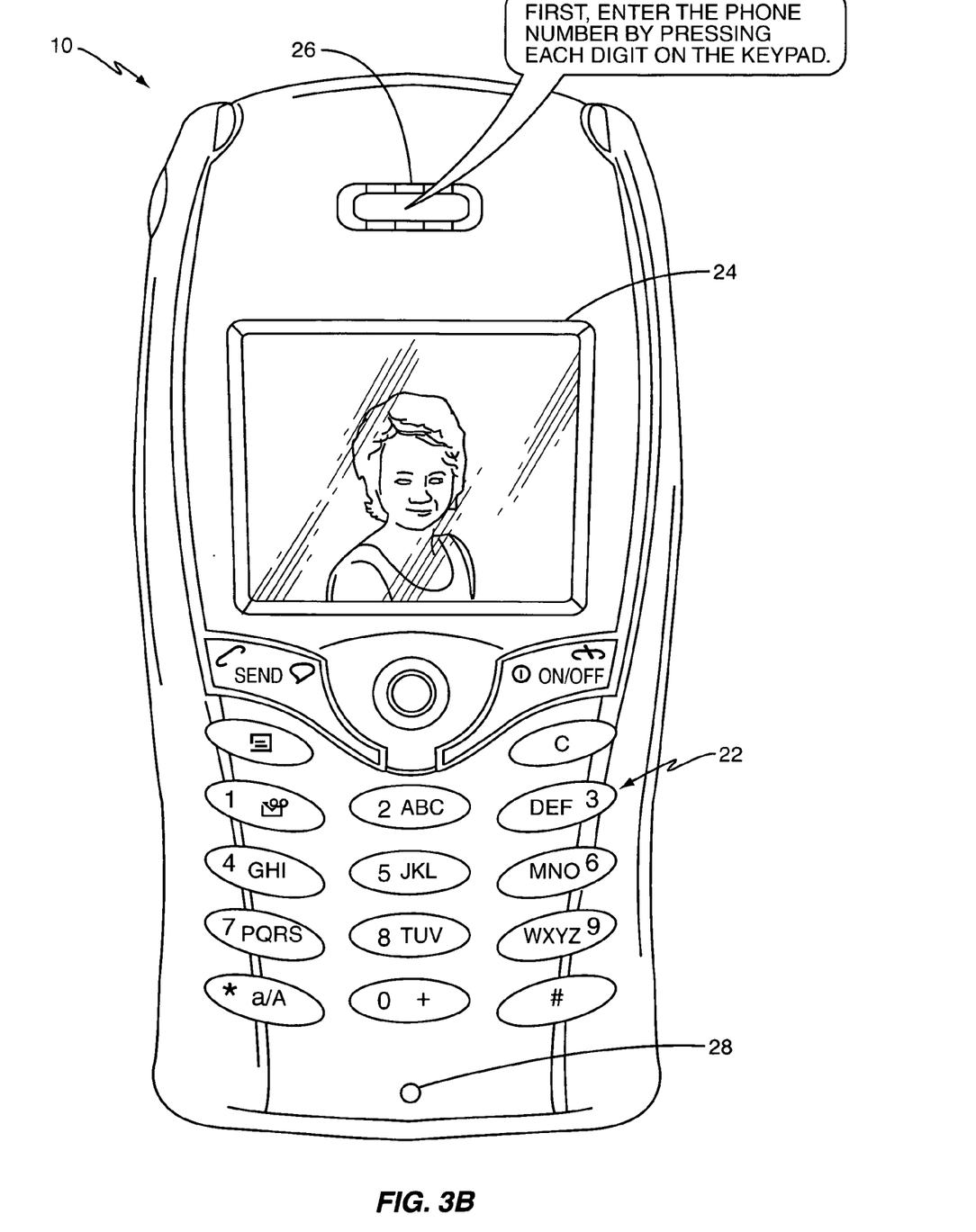
Figure 3C:
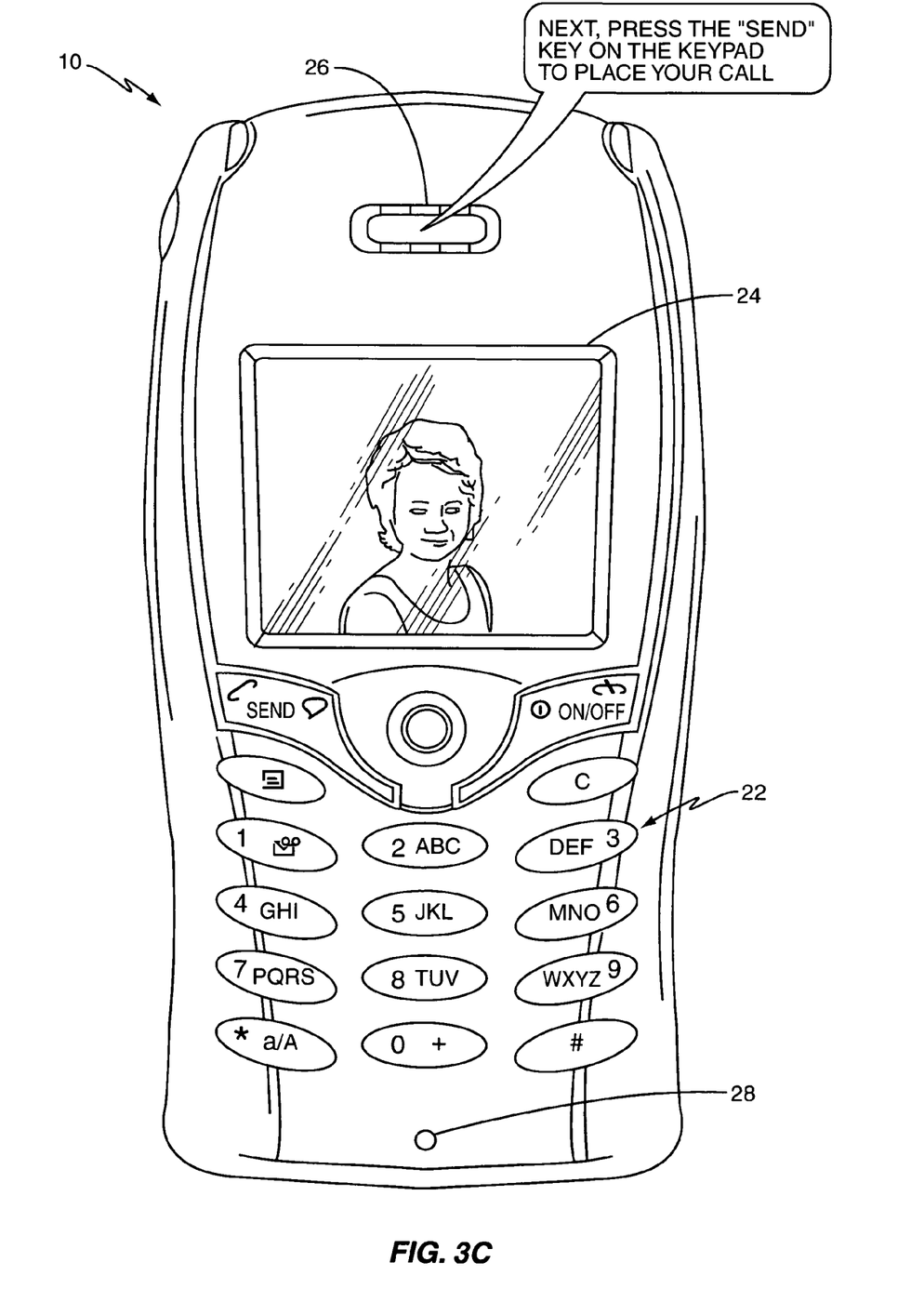
Figure 3D:
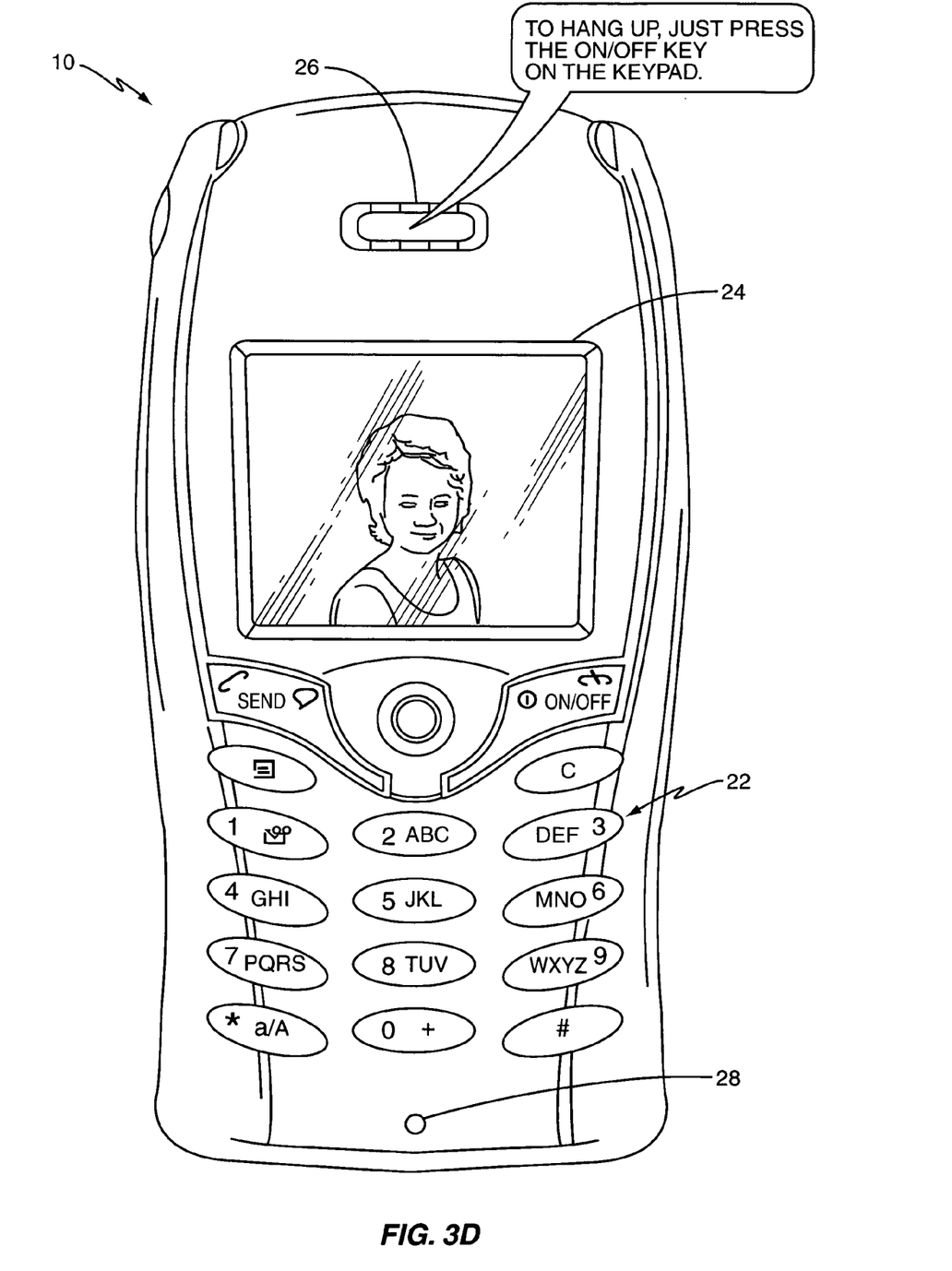

FIGS. 3A-3D illustrate one type of multimedia-based tutorial that might be used according to the method of FIG. 2 to guide the user through a direct dial method of placing a phone call. The user is prompted as to whether he or she wishes to place the call (FIG. 3A). Provided the user answers affirmatively, the controller 32 guides the user through the steps of entering the destination phone number using the keypad 22 (FIG. 3B), and pressing the send key (FIG. 3C). While the call is on-going, the controller 32 may suspend the tutorial to allow the user to speak. However, controller 32 may continue to track the progress of the call and help the user when needed. In FIG. 3D, for example, the controller 32 detects when call is finished, and continues the multimedia tutorial to guide the user through the steps of disconnecting the call (FIG. 3D).

There are various methods in which the controller 32 can detect the end of a call. In one embodiment, speech recognition circuitry 46 is controlled to detect periods of speech inactivity that last for a predetermined time period. In another embodiment, controller 32 receives a disconnect message from the network. In such cases, controller 32 might render a tutorial (e.g., FIG. 3D) that helps the user through a disconnection process. The tutorial may also help inexperienced users understand when a call has been inadvertently dropped, and assist the user to perform the steps of reconnecting the call.

Figure 4:
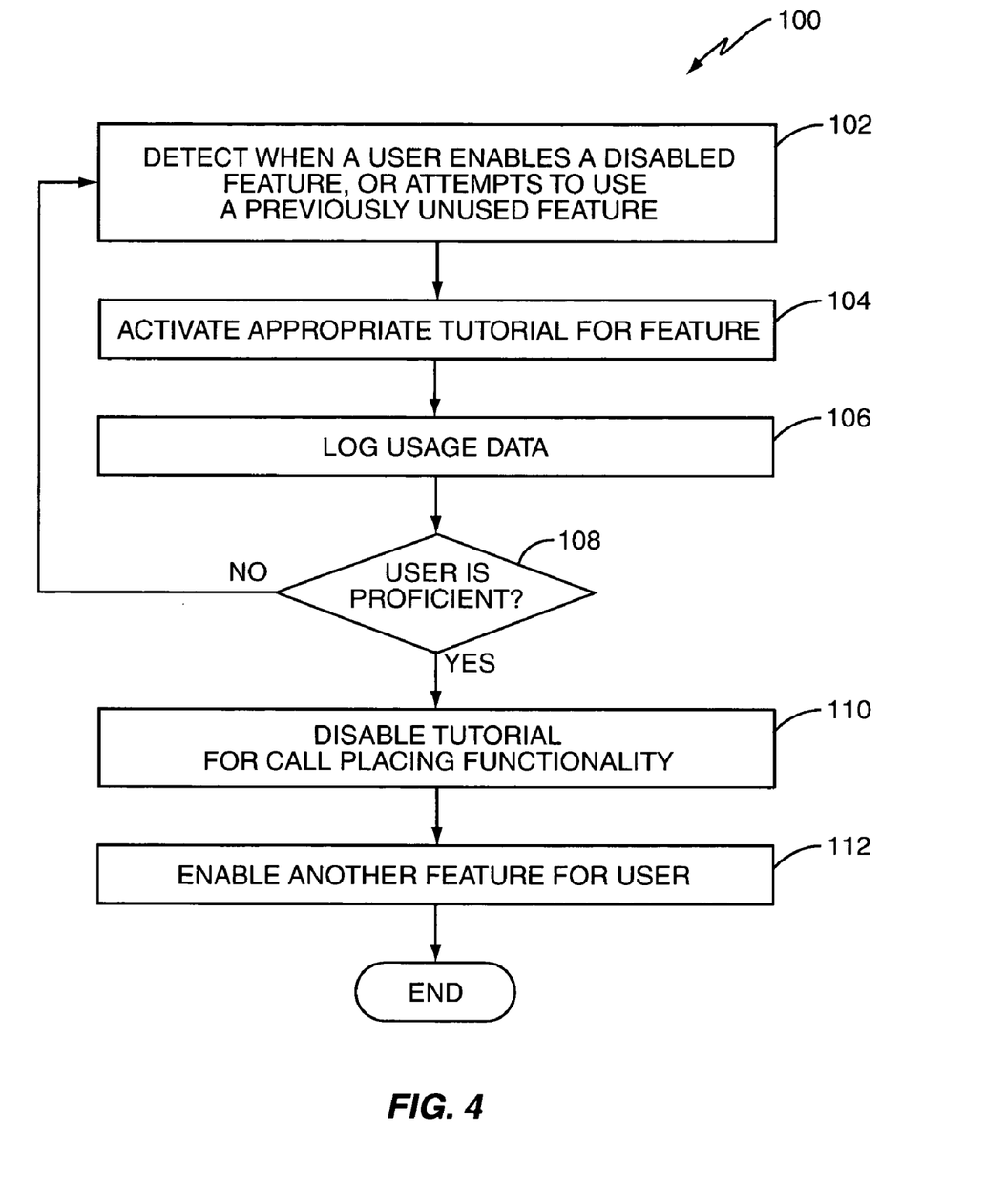
FIG. 4 is a flow chart illustrating a method according to another embodiment of the present invention.

The previous embodiment illustrates how the controller 32 might control access to basic call placing features and functionality to assist very inexperienced users. FIG. 4 illustrates an embodiment wherein the controller 32 assists the user to explore other, more complex, features of camera phone 10, such as the ability to capture images.

Method 100 may begin when controller 32 detects that a user has manually enabled a previously disabled feature, or is attempting to use a feature that the user has not yet mastered, such as the capturing images with camera 50 (box 102). Controller 32 activates the appropriate tutorial to walk the user through the steps of capturing an image (box 104), and stores statistical data indicative of the user's current proficiency level at using the feature (box 106). When controller 32 determines from the statistical data that the user is proficient at using camera 50 (box 108), controller 32 disables the tutorial (box 110) and enables a new feature (box 112).

Figure 5:
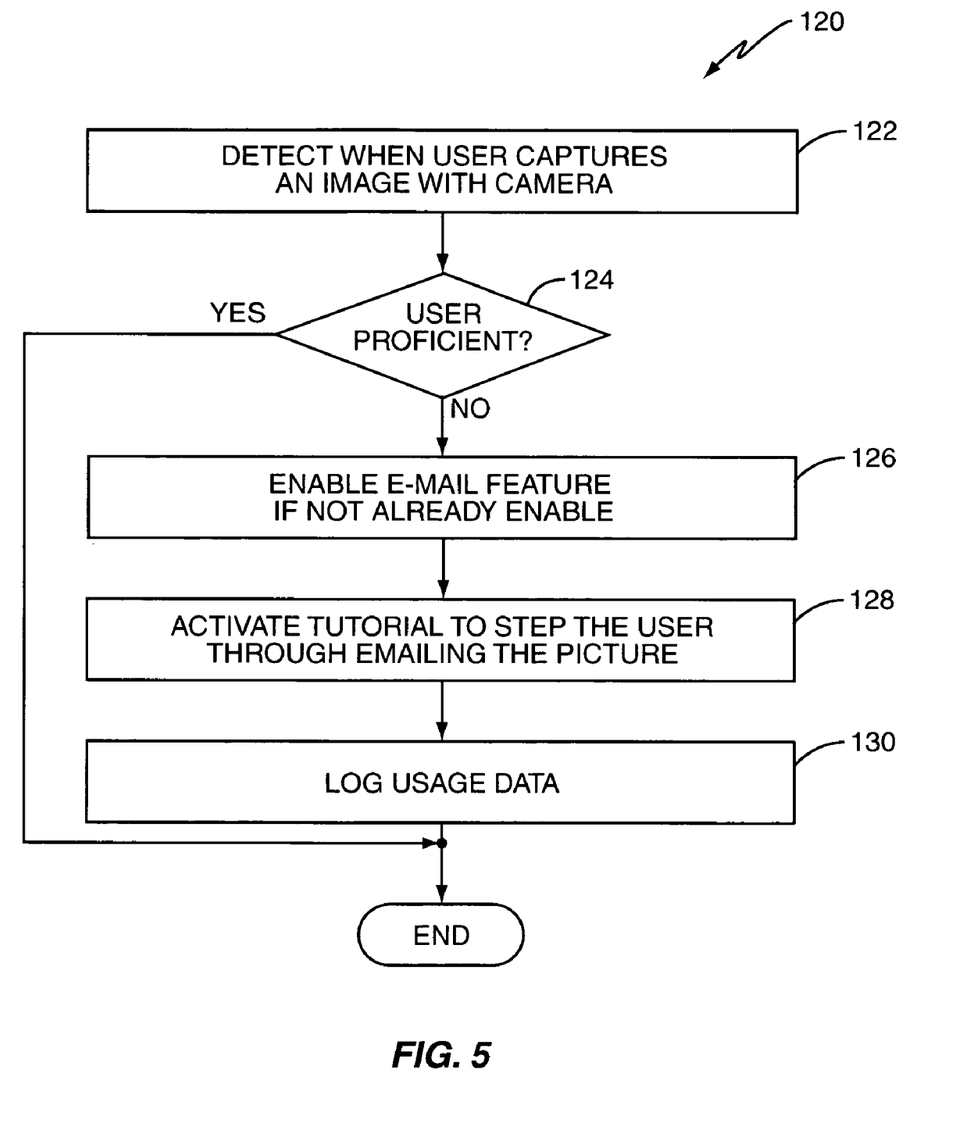
FIG. 5 is a flow chart illustrating a method according to another embodiment of the present invention.

In some embodiments, the controller 32 is also configured to selectively enable additional features based on the user's proficiency at a given feature. FIG. 5, for example, illustrates a method 120 wherein the controller 32 assists a user who has never used email to send a captured image to a remote party. Method 120 begins when the controller 32 detects that the user has captured an image (box 122). If controller 32 determines from the statistical data that the user is inexperienced at using email (box 124), controller 32 might enable the features needed to perform that task (box 126) and activate the appropriate tutorial (box 128). The tutorial may comprise a multimedia-based tutorial that walks the user through the steps of saving the image to memory, selecting a remote party from a stored list, and transmitting the image to the remote party. Controller 32 then saves the statistical data for determining whether the user has become proficient at the task (box 130). If the user is already experienced at using the email feature, controller 32 might simply log the statistical data (box 130).

Figure 6:
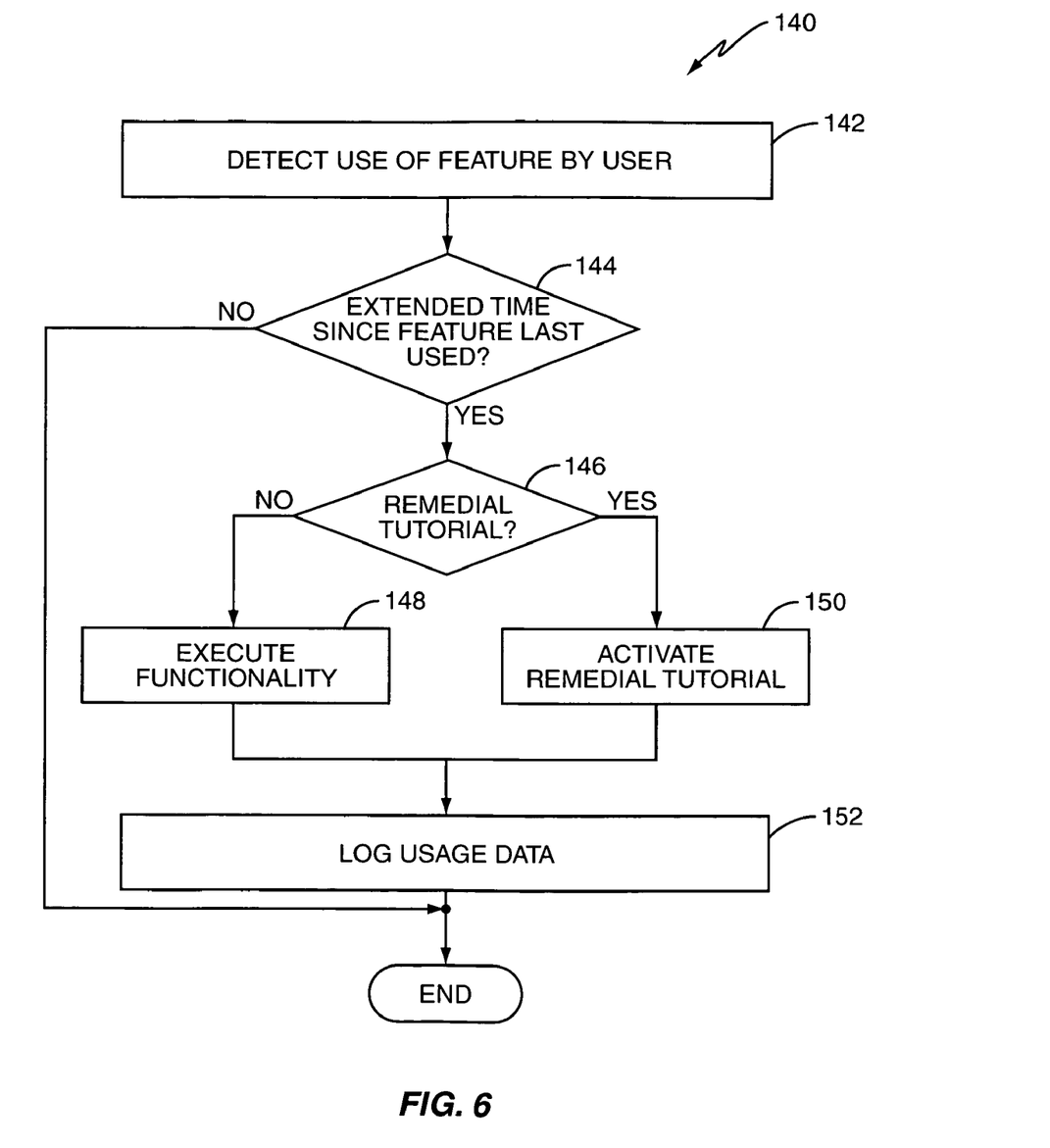
FIG. 6 is a flow chart illustrating a method according to another embodiment of the present invention.

In some embodiments, such as the embodiment of FIG. 6, the controller 32 could also use this time-qualified statistical data to determine whether the user might need remedial assistance in operating a feature. Method 140 begins when controller 32 detects that the user has invoked the email feature (box 142). To determine whether the user might need remedial assistance in operating the feature, controller 32 might compare a current date and time to the date and time saved with the statistical data. If the elapsed time exceeds a predetermined threshold (box 144), controller 32 may display a screen to ask the user if he or she needs a remedial tutorial (box 146). Answering 'NO' could cause the controller 32 to simply allow the user to operate the email feature (box 148), while answering 'YES' could cause the controller 32 to activate the appropriate remedial tutorial (box 150). Controller 32 may then update the date and time stored in the statistical data for later use in determining user skill level (box 152).

It should be noted that the previous embodiments are described in the context of specific features; however, this is for clarity and ease of discussion only. The present invention may be used to control access to any feature or functionality of a wireless communications device. Such features include enabling and using the short-range transceiver 42 to browse the Internet when proximate a Wifi hot spot, or join a peer-to-peer network to share files stored in memory 34. Other features include, but are not limited to, text messaging, game play, and scheduling events using a calendar application.

Further, the controller 32 is not limited to determining a user's experience or skill level by performing simple comparisons between current data and statistical data, or by relying on the user's explicit input describing his or her own skill level. In some embodiments, the controller 32 stores a value indicative of the user's skill level. The controller 32 may increase the stored value whenever the user does not commit an error while using a feature, or successfully completes a tutorial. The controller 32 might also decrease the value whenever the user commits an error while using the feature. When the value reaches a predetermined threshold, the user is deemed to have the requisite skill level for a particular feature. If after the user is proficient at a feature the value dips below the threshold, the controller 32 might offer remedial tutorials or invoke a help screen for the user.

Some types of errors could be weighted more heavily than others to compensate for errors that are not properly attributable to the user. For example, controller 32 might weight keypress errors detected when the user directly dials a phone number more heavily than a "no-match" condition detected when the user speaks the name of a remote party. Thus, weighting factors could allow the controller 32 to compensate for errors that might result from irregularities in the user's speech when determining the user's skill level, or when determining whether the user is proficient at a given feature.

It should be also noted that controller 32 might maintain the software modules needed for executing the disabled features in a compressed state in memory 34. Controller 32 could uncompress these modules when their associated features or functions are enabled for the user. Maintaining the software modules in a compressed state until the user is proficient enough to use that feature facilitates prudent usage of limited resources.

Further, the tutorials need not be multimedia-based tutorials that use videos and/or images coupled with audio to teach a user how to perform a given feature. The tutorials may comprise one or more text-based help screens with or without accompanying audio.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A wireless communications device comprising:
   a transceiver to send and receive signals to and from a remote party via wireless communications network;
   memory to store instructions corresponding to features available with the wireless communications device, and to store usage data comprising indicators of a user's proficiency at operating the features; and a controller configured to:
compensate the usage data for errors that are not attributable to the user;
determine the user's skill level relative to the features available with the wireless communications device based on the compensated usage data; and
selectively enable the features based on the determined skill level.

2. The wireless communications device of claim 1 wherein the controller is configured to detect the usage data by detecting user interaction with the wireless communications device while the user operates a feature.

3. The wireless communications device of claim 2 wherein the controller is configured to detect the usage data over a period of time, and save indicators of the user interaction to the memory.

4. The wireless communications device of claim 2 wherein the controller determines the user's skill level based on detecting keypress errors committed by the user while using the feature.

5. The wireless communications device of claim 2 wherein the controller determines the user's skill level based on an elapsed length of time since the user last used the feature.

6. The wireless communications device of claim 2 wherein the controller determines the user's skill level based on a predetermined number of uses of the feature.

7. The wireless communications device of claim 1 wherein the controller is configured to activate a tutorial associated with a selectively enabled feature to teach the user how to use the feature.

8. The wireless communications device of claim 7 wherein the controller determines the user's skill level based on the user's successful completion of the tutorial.

9. The wireless communications device of claim 7 wherein the tutorial comprises a multimedia presentation that steps the user through a process of operating the feature.

10. The wireless communications device of claim 1 wherein the controller is configured to selectively disable features based on the determined skill level.

11. The wireless communications device of claim 1 wherein the controller is configured to decompress a module that includes the instructions for a feature when the controller selectively enables the feature.

12. The wireless communications device of claim 1 wherein the device comprises a cellular telephone.

13. A method of controlling access to features of a wireless communications device, the method comprising:
storing instructions associated with features available with the wireless communications device in memory of the wireless communications device;
storing usage data in the memory of the wireless communications device, the usage data comprising indicators of a user's proficiency at operating the features;
compensating the usage data for errors that are not attributable to the user;
determining a skill level of the user relative to the features available with the wireless communications device based on the compensated usage data; and
selectively enabling the features based on the determined skill level.

14. The method of claim 13 wherein determining a skill level of the user relative to the features available with the wireless communications device comprises detecting user interaction with the wireless communications device while the user operates a selectively enabled feature.

15. The method of claim 14 wherein detecting user interaction comprises detecting indicators of the user interaction over a period of time, and saving the indicators to the memory.

16. The method of claim 15 wherein determining a skill level of a user comprises determining the user's skill level based on the saved indicators.

17. The method of claim 14 wherein determining a skill level of the user is based on a detected number of user keypress errors committed while the user operates the feature.

18. The method of claim 14 wherein determining a skill level of the user is based on an elapsed length of time since the user last operated the feature.

19. The method of claim 14 wherein determining a skill level of the user is based on a predetermined number of uses of the feature.

20. The method of claim 13 further comprising activating a tutorial associated with a selectively enabled feature to teach the user how to operate the feature.

21. The method of claim 20 wherein determining a skill level of the user is based on the user's successful completion of the tutorial.

22. The method of claim 13 further comprising selectively disabling one or more features based on the determined skill level of the user.

23. The method of claim 13 further comprising decompressing a software module that includes the instructions for a feature when the controller selectively enables the feature.

* * * * *